United States Patent
Pan et al.

(10) Patent No.: US 9,655,185 B2
(45) Date of Patent: May 16, 2017

(54) LINEAR LED DRIVER AND CONTROL METHOD THEREOF

(71) Applicant: RICHTEK TECHNOLOGY CORPORATION, Zhubei, Hsinchu County (TW)

(72) Inventors: Jiun-Hung Pan, Taipei (TW); Tong-Cheng Jao, Taichung (TW); Yi-Wei Lee, Taipei (TW); Isaac Y. Chen, Jubei (TW)

(73) Assignee: Richtek Technology Corp., Zhubei, Hsinchu County (TW)

( * ) Notice: Subject to any disclaimer, the term of this patent is extended or adjusted under 35 U.S.C. 154(b) by 0 days.

(21) Appl. No.: 14/920,240

(22) Filed: Oct. 22, 2015

(65) Prior Publication Data

US 2016/0212821 A1    Jul. 21, 2016

(30) Foreign Application Priority Data

Jan. 20, 2015   (TW) .............................. 104101863 A

(51) Int. Cl.
    *H05B 33/08* (2006.01)
(52) U.S. Cl.
    CPC .......... *H05B 33/083* (2013.01); *Y02B 20/341* (2013.01); *Y02B 20/345* (2013.01)

(58) Field of Classification Search
    None
    See application file for complete search history.

(56) References Cited

U.S. PATENT DOCUMENTS

| | | | |
|---|---|---|---|
| 8,421,374 B2 | 4/2013 | Lin et al. | |
| 8,803,431 B2 | 8/2014 | Chiang et al. | |
| 2010/0033100 A1* | 2/2010 | Chao | H05B 33/0827 315/210 |
| 2010/0253245 A1 | 10/2010 | Du et al. | |
| 2013/0147362 A1 | 6/2013 | Lee et al. | |
| 2014/0097754 A1* | 4/2014 | Chiang | H05B 33/089 315/122 |

FOREIGN PATENT DOCUMENTS

TW    I415517    11/2013

* cited by examiner

*Primary Examiner* — Dedei K Hammond
(74) *Attorney, Agent, or Firm* — Muncy, Geissler, Olds & Lowe, P.C.

(57) ABSTRACT

A linear LED driver comprises a transistor having an input terminal coupled to a LED. When the transistor is turned on, the LED is lighted. The linear LED driver further includes a protection circuit for judging whether an instant high voltage variation occurs or not according to at least one of the voltages of a control terminal and an output terminal of the transistor so as to achieve a protection function.

28 Claims, 10 Drawing Sheets

US 9,655,185 B2

LINEAR LED DRIVER AND CONTROL METHOD THEREOF

FIELD OF THE INVENTION

The present invention is related generally to a linear light emitting diode (LED) driver and, more particularly, to a linear LED driver capable of avoiding an abnormal or an unstable state occurring at the circuit caused by an instant high voltage variation.

BACKGROUND OF THE INVENTION

LED drivers can be classified into isolated type and non-isolated type. The LED driver of isolated type needs a transformer to separate the primary side and the secondary side and thus needs higher costs. Differently, the LED driver of non-isolated type does not need a transformer, so the costs thereof are lower. However, the LED driver of non-isolated type easily triggers an abnormal or an unstable state occurring at the circuit caused by an instant high voltage variation.

FIG. 1 shows a conventional non-isolated linear LED driver 10, which includes a bridge rectifier 12 for rectifying an AC voltage Vac to generate a DC voltage VIN for LEDs, and an integrated circuit (IC) 14 for controlling the LEDs to be lighted. In the IC 14, switches 18, 20, 22, and 24 are serially connected to the LEDs via pins S1, S2, S3, and S4, respectively, and a controller 16 controls the switching of the switches 18, 20, 22, and 24 to decide which LED is to be lighted. The linear LED driver 10 may experience an instant high voltage variation caused by a lightning stroke, a system electro-static discharge (ESD), AC in multiple touch, or a triode alternating current (TRIAC) dimming.

Taking the TRIAC dimming as an example shown in FIG. 2, a conventional TRIAC dimmer includes resistors R1 and R2, a capacitor C1, a bidirectional trigger diode (DIAC) 26, and a TRIAC switch 28. The resistor R1 is a variable resistor. The TRIAC switch 28 is off at the beginning and consequently the AC voltage Vac is not inputted to the load. The resistors R1 and R2 generate a current according to the AC voltage to charge the capacitor C1. When the voltage at the capacitor C1 reaches a breakover voltage of the DIAC 26, the DIAC 26 will be turned on so as to turn on the TRIAC switch 28. When the TRIAC switch 28 is turned on, the AC voltage Vac is inputted to the load and the capacitor C1 starts discharging. The TRIAC switch 28 keeps in the on state until the AC voltage Vac becomes zero or until a current I1 passing through the TRIAC switch 28 is lower than a threshold. That is to say, the TRIAC dimmer turns the AC voltage Vac into an AC phase-cut voltage that includes a conduction angle. The AC phase-cut voltage Vtr will be rectified by the bridge rectifier 12 in FIG. 1 to generate the DC voltage VIN as shown by a waveform 30 in FIG. 2. As shown by the waveform 30 in FIG. 2, the DC voltage VIN generated by the TRIAC dimming will instantly jump to a high voltage from 0V, which causes an instant high voltage variation.

FIG. 3 shows the switch 18 in FIG. 1. The AC voltage Vac is a high voltage, so the switch 18 has to be a high-voltage component. Generally, the switch 18 can be a metal-oxide-semiconductor field effect transistor (MOSFET) or an insulated gate bipolar transistor (IGBT). FIG. 4 shows waveforms of the DC voltage VIN that is subjected to an instant high voltage variation, in which the waveform 32 represents the voltage of the pin S1, and the waveform 34 represents the voltage of a control terminal of the switch 18. Referring to FIGS. 1, 3, and 4, an input terminal 182 of the switch 18 is coupled to the pin S1, a control terminal 184 of the switch 18 is coupled to the controller 16, and an output terminal 186 of the switch 18 is coupled to a ground terminal. When the input voltage VIN occurs an instant high voltage variation, the voltage at the pin S1 raises rapidly, as shown by the waveform 32 in FIG. 4, thereby generating a large current to charge a parasitic capacitance Cdg1 between the input terminal and the control terminal of the switch 18. Consequently, the voltage of the control terminal of the switch 18 raises rapidly, as shown by the waveform 34 in FIG. 4. When the voltage of the control terminal of the switch 18 is higher than a threshold Vth, an unstable state will be resulted. The switch 18 can be even burned out. In some applications, the output terminal 186 of the switch 18 may be coupled to some low-voltage circuits. When the voltage at the pin S1 raises rapidly, a large current will go through the switch 18, which incurs the voltage of the output terminal 186 of the switch 18 raises rapidly. As a result, the low-voltage circuit connected to the output terminal 186 of the switch 18 cannot endure the instant high voltage variation, and therefore is burned out.

U.S. Patent Publication No. 2010/0253245 discloses a method for solving the instant high voltage variation, which inserts a current limiting circuit like an overvoltage protection circuit between the LED driver and the LEDs. The current limiting circuit detects a voltage on the LEDs to control a switch that is serially connected to the LEDs. However, the current limiting circuit needs a large component that has to be additionally installed out of the IC. Therefore, it introduces a large parasitic capacitor, which incurs a slower response of the current limiting circuit. Moreover, U.S. Patent Publication No. 2010/0253245 merely solves the problem of the instant high voltage variation that is caused by surge. The instant high voltage variation that is caused by the system ESD, AC in multiple touches, or the TRIAC dimming, is still not improved.

SUMMARY OF THE INVENTION

An objective of the present invention is to provide a linear LED driver and a control method thereof, for avoiding an abnormal or an unstable state on a circuit caused by an instant high voltage variation.

Another objective of the present invention is to provide a linear LED driver and a control method thereof, for solving an instant high voltage variation caused by various circumstances.

A further objective of the present invention is to provide a linear LED driver and a control method thereof, for achieving a rapid response to an instant high voltage variation.

According to the present invention, a linear LED driver comprises a transistor, a current source, and a protection circuit. The transistor includes an input terminal coupled to a LED. When the transistor is turned on, the LED is lighted. The current source is coupled to an output terminal of the transistor for regulating the current flowing through the LED. The protection circuit is coupled to the transistor for limiting at least one maximum of a voltage of a control terminal of the transistor and a voltage of the output terminal of the transistor. Accordingly, the linear LED driver can be prevented from an abnormal or an unstable state caused by an instant voltage variation occurring at the input terminal of the transistor. The protection circuit and the transistor can be integrated on a same IC so that the protection circuit has a smaller parasitic capacitor to achieve a faster response.

According to the present invention, a control method of a linear LED driver comprises steps of turning on a transistor to light a LED, and limiting at least one maximum of a voltage of a control terminal of the transistor and a voltage of an output terminal of the transistor.

The linear LED driver and the method according to the present invention achieve the protection of an instant high voltage variation by limiting at least one maximum of the voltage of the control terminal of the transistor and the voltage of the output terminal of the transistor. In particular, the linear LED driver and the method according to the present invention detect at least one of the voltage of the control terminal of the transistor and the voltage of the output terminal of the transistor for the protection function. Thus, no matter how an instant high voltage variation is caused, it will be detected and trigger the protection function.

BRIEF DESCRIPTION OF THE DRAWINGS

These and other objectives, features and advantages of the present invention will become apparent to those skilled in the art upon consideration of the following description of the preferred embodiments according to the present invention taken in conjunction with the accompanying drawings, in which.

DETAILED DESCRIPTION OF THE INVENTION

Figure 1:
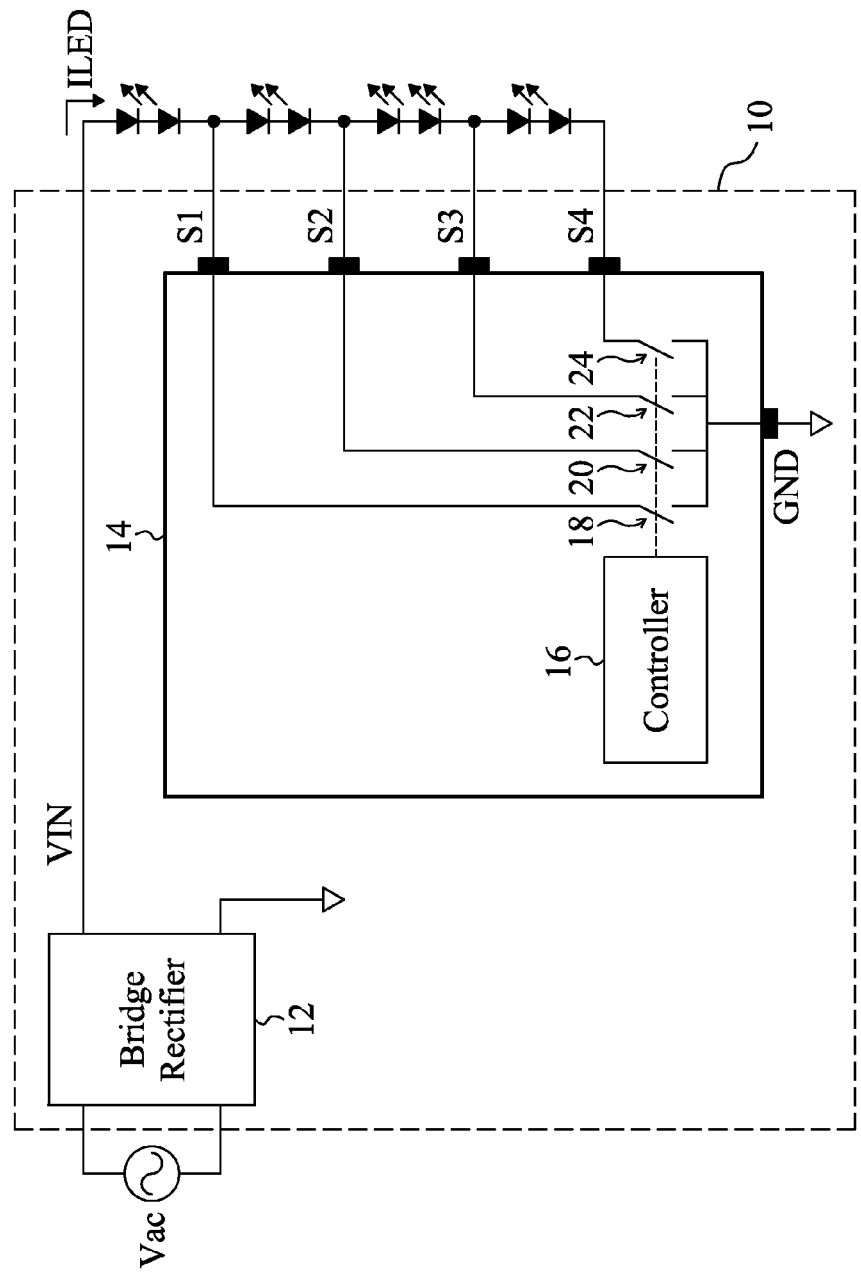
FIG. 1 shows a conventional non-isolated linear LED driver.
Figure 2:
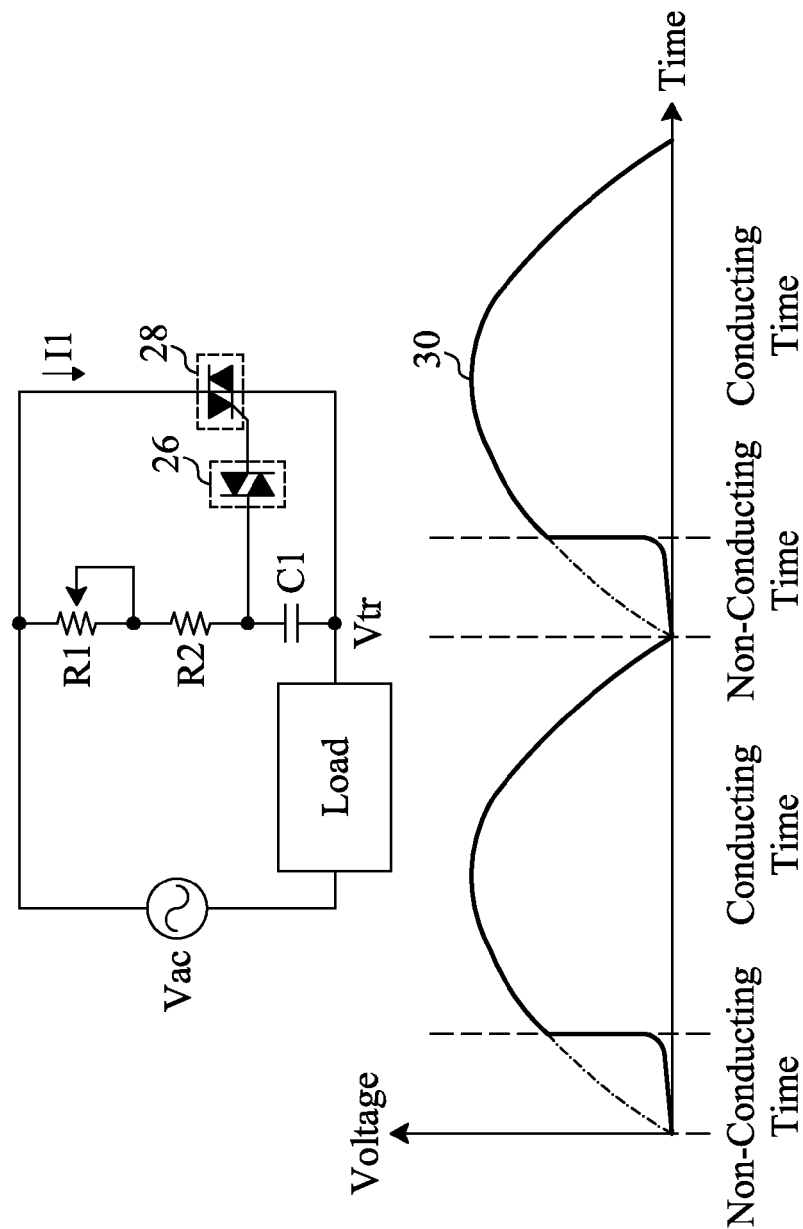
FIG. 2 shows a conventional TRIAC dimmer.
Figure 4:
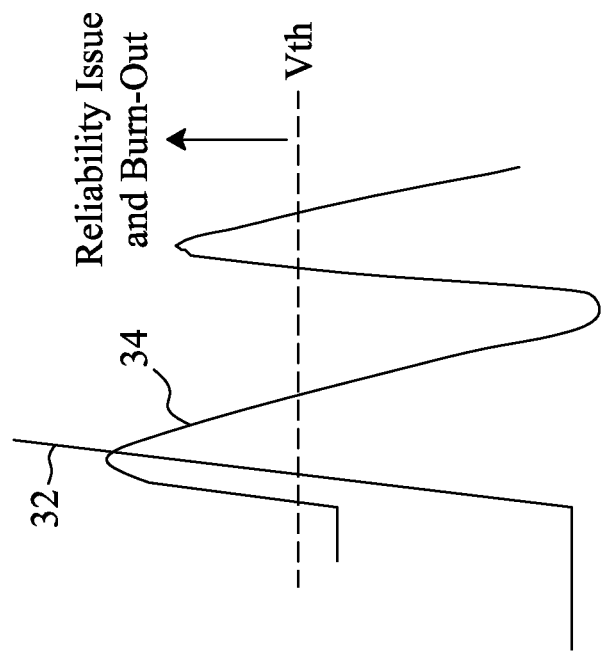
FIG. 4 shows a waveform of a voltage on the switch in FIG. 3 when an instant high voltage variation occurs at a DC voltage VIN.
Figure 3:
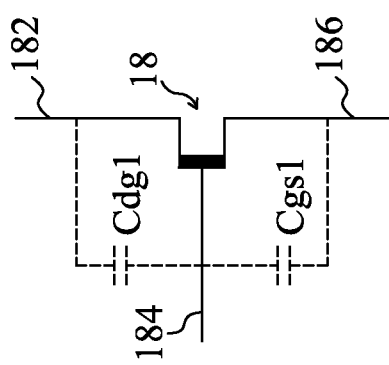
FIG. 3 is a schematic view of a switch in FIG. 1.
Figure 5:
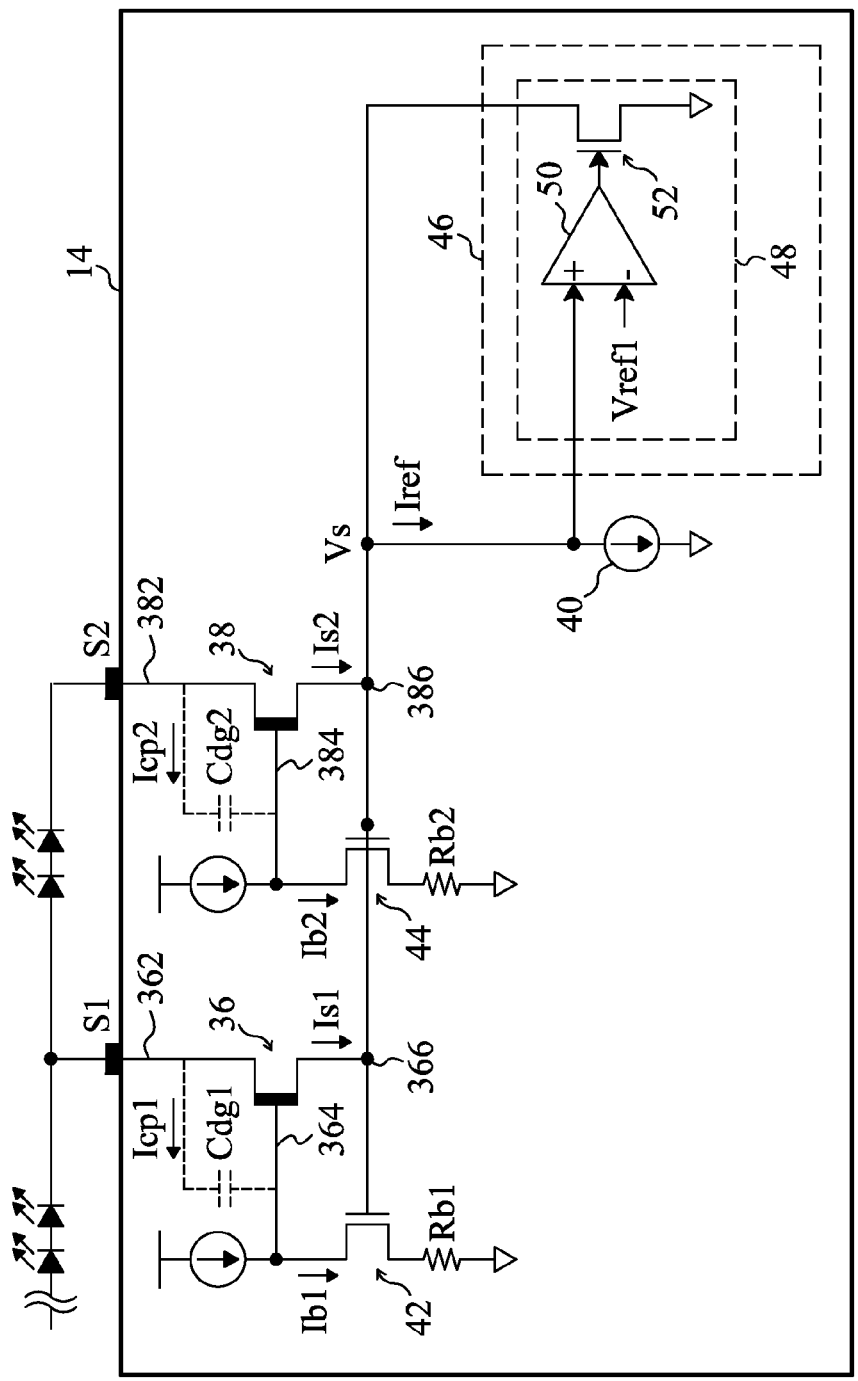
FIG. 5 shows a first embodiment of the present invention.

FIG. 5 shows a first embodiment of the present invention, in which only an IC 14 of a linear LED driver 10 is shown, and other parts of the linear LED driver 10 can be found in FIG. 1. In the IC 14, an input terminal 362 of a transistor 36 is coupled to the LED via a pin S1. When the transistor 36 is turned on, the LED that is serially connected to the transistor 36 will be lighted. An input terminal 382 of a transistor 38 is coupled to the LED via a pin S2. When the transistor 38 is turned on, the LED that is serially connected to the transistor 38 will be lighted. The transistors 36 and 38 are both high-voltage components and can be MOSFET or IGBT. Output terminals 366 and 386 of the transistors 36 and 38 are coupled to a current source 40. The current source 40 regulates the current flowing through the LEDs and lets the current equal to a preset current Iref so as to control the brightness of the LEDs. When the sum of currents Is1 and Is2 of the output terminals of the transistors 36 and 38 is lower than the current Ire of the current source 40, a voltage Vs on the output terminals 366 and 386 of the transistors 36 and 38 decreases, and currents Ib1 and Ib2 flowing through transistors 42 and 44 also decrease. At the same time, the voltages of the control terminals 364 and 384 of the transistors 36 and 38 increase, and the currents Is1 and Is2 also increase. Oppositely, when the sum of the currents Is1 and Is2 is higher than the current Ire of the current source 40, the voltage Vs increases, and the currents Ib1 and Ib2 also increase. Consequently, the voltages of the control terminals 364 and 384 of the transistors 36 and 38 decrease, and the currents Is1 and Is2 also decrease. A protection circuit 46 is coupled to the transistors 36 and 38 for limiting a maximum of the voltages on the transistors 36 and 38, thereby preventing the linear LED driver 10 from an abnormal or an unstable state caused by an instant voltage variation occurring at the input terminal 362 or 382 of the transistor 36 or 38. The protection circuit 46 includes a clamping circuit 48 coupled to the output terminals 366 and 386 of the transistors 36 and 38 for limiting the maximum voltages of the output terminals 366 and 386 of the transistors 36 and 38. In this embodiment, the clamping circuit 46 is an active circuit, which includes an operational amplifier 50 and a switch 52. The switch 52 is coupled between the output terminals 366 and 386 of the transistors 36 and 38 and a ground terminal. A positive input terminal of the operational amplifier 50 is coupled to the output terminals 366 and 386 of the transistors 36 and 38. A negative input terminal of the operational amplifier 50 receives a threshold Vref1. An output terminal of the operational amplifier 50 is coupled to a control terminal of the switch 52. When an instant high voltage variation occurs at the pin S1 or S2, the currents Is1 and Is2 of the output terminals 366 and 386 of the transistors 36 and 38 increase, and the voltage Vs on the output terminals 366 and 386 of the transistors 36 and 38 also increase. When the voltage Vs is higher than a threshold Vref1, the operational amplifier 50 turns on the switch 52 so as to establish a discharge path to discharge the voltage Vs. Accordingly, the maximum voltages of the output terminals 366 and 386 of the transistors 36 and 38 are limited.

Figure 6:
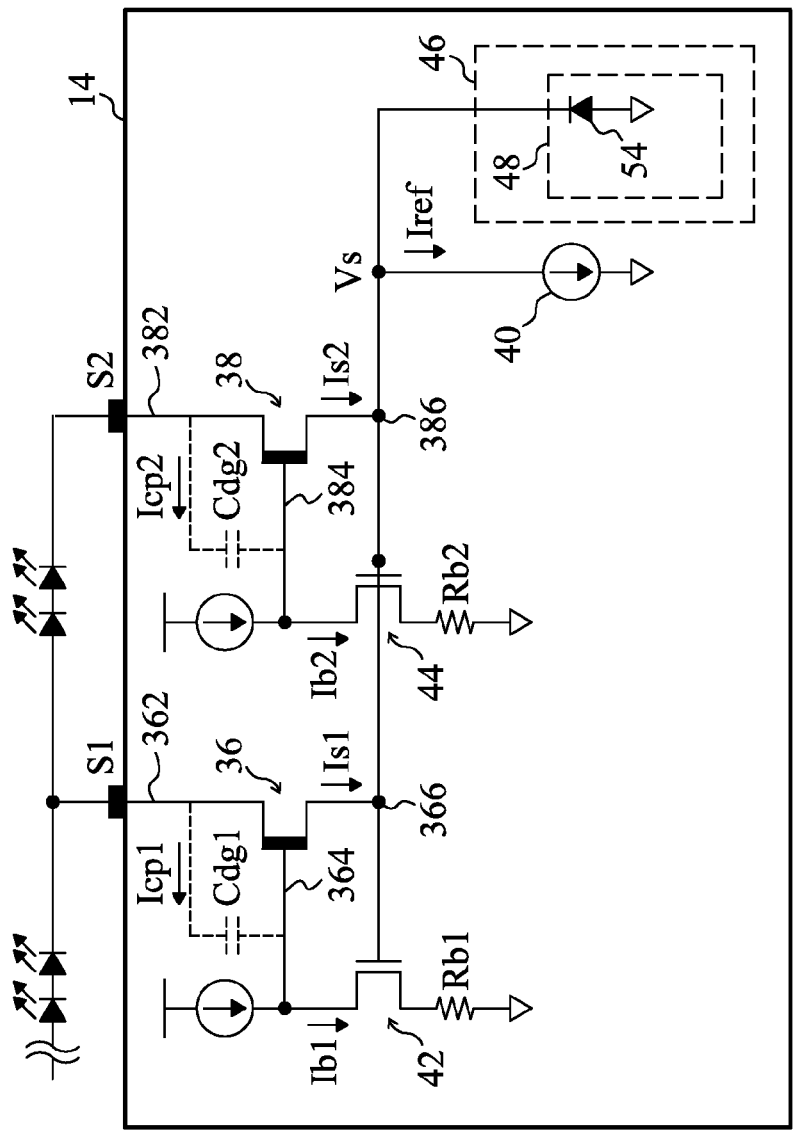
FIG. 6 shows another embodiment for the clamping circuit shown in FIG. 5.

FIG. 6 shows another embodiment for the clamping circuit 48 shown in FIG. 5. In this embodiment, the clamping circuit 48 is a passive circuit, which includes a Zener diode 54 for limiting the maximum voltages of the output terminals 366 and 386 of the transistors 36 and 38. An anode of the Zener diode 54 is coupled to a ground terminal, and a cathode of the Zener diode is coupled to the output terminals 366 and 386 of the transistors 36 and 38. When an instant high voltage variation occurs at the pin S2 or S2, the voltage Vs on the output terminals 366 and 386 of the transistors 36 and 38 increase. When the voltage Vs is higher than a threshold (i.e., the breakdown voltage of the Zener diode 54), the Zener diode 54 will be conductive to establish a discharge path, so as to discharge the voltage Vs. Thereby, the maximum voltages of the output terminals 366 and 386 of the transistors 36 and 38 are limited.

In the embodiments of FIGS. 5 and 6, the transistors 36 and 38 utilize the same current source 40 and the same clamping circuit 48. In other embodiments, the transistors 36 and 38 can cooperate with different current sources 40 and clamping circuits 48, respectively.

Figure 7:
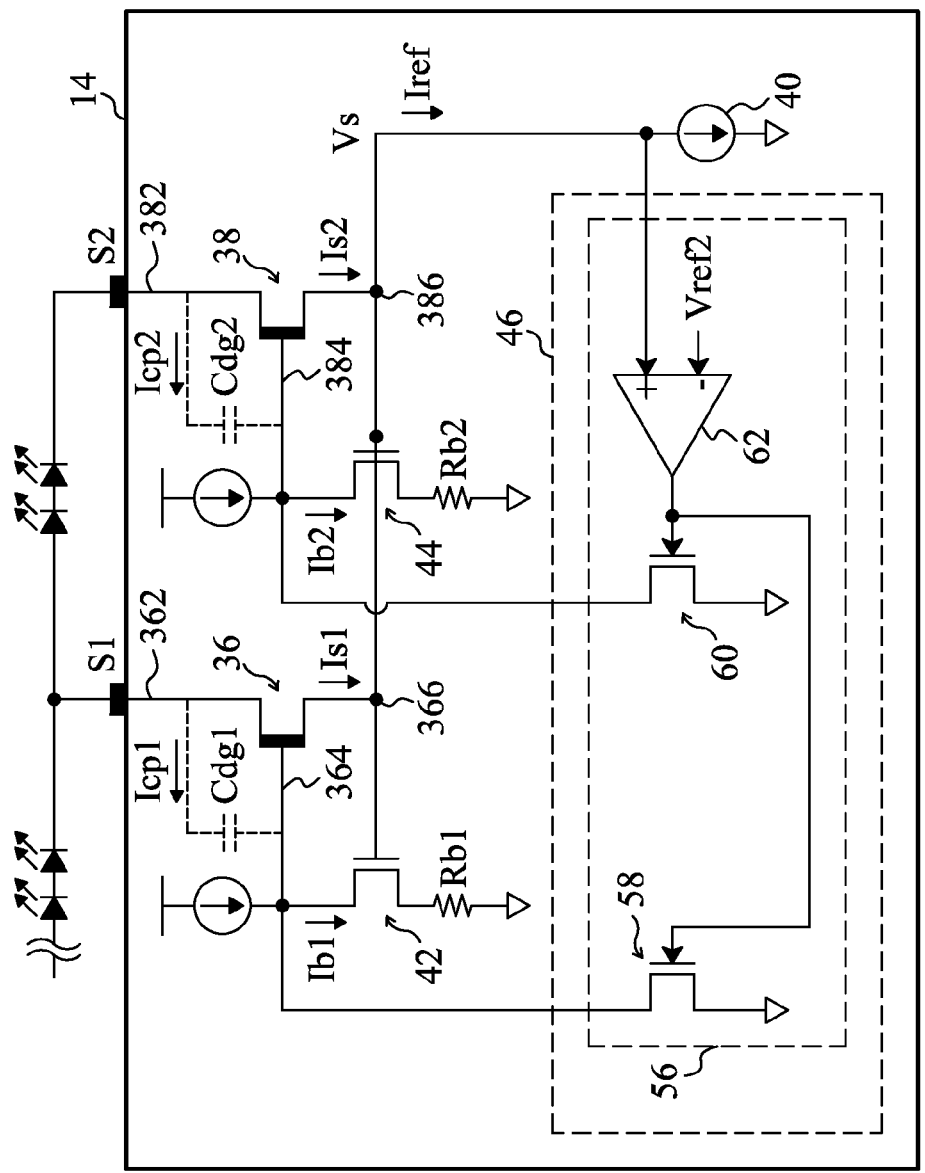
FIG. 7 shows a second embodiment of the present invention.

FIG. 7 shows a second embodiment of the present invention. This embodiment comprises the similar circuitry as that in FIG. 5 including the transistors 36, 38, 42, and 44, and the current source 40. Differently, the protection circuit 46 in FIG. 7 includes a clamping circuit 56 coupled to control terminals 364 and 384 of the transistors 36 and 38 as well as the output terminals 366 and 386 thereof. The clamping circuit 56 detects the voltage Vs on the output terminals 366 and 386 of the transistors 36 and 38, thereby turning off the transistors 36 and 38 when the voltage Vs is higher than a threshold Vref2. Accordingly, the maximum voltages of the output terminals 366 and 386 of the transistors 36 and 38 can be limited. In the embodiment of FIG. 7, the clamping circuit 56 is an active circuit including switches 58 and 60 and an operational amplifier 62. The switch 58 is coupled between the control terminal 364 of the transistor 36 and the ground terminal, and the switch 60 is coupled between the control terminal 384 of the transistor 38 and the ground terminal. A positive input terminal of the operational amplifier 62 is coupled to the output terminals 366 and 386 of the transistors 36 and 38, and a negative input terminal of the operational amplifier 62 receives a threshold Vref2. The output terminal of the operational amplifier 62 is coupled to the control terminals of the switches 58 and 60. When an instant high voltage variation occurs at the pin S1 or S2, the voltage Vs on the output terminals 366 and 386 of the transistors 36 and 38 increase. When the voltage Vs is higher than the threshold Vref2, the operational amplifier 62 turns on the switches 58 and 60 so as to turn off the transistors 36 and 38. Accordingly, the maximum voltages of the output terminals 366 and 386 of the transistors 36 and 38 are limited. In the embodiment of FIG. 7, the transistors 36 and 38 utilize the same current source 40 and the same operational amplifier 62. In other embodiments, the transistors 36 and 38 can cooperate with different current sources 40 and operational amplifier 62, respectively. Moreover, the clamping circuit 56 can be a passive circuit composed of passive components.

Figure 8:
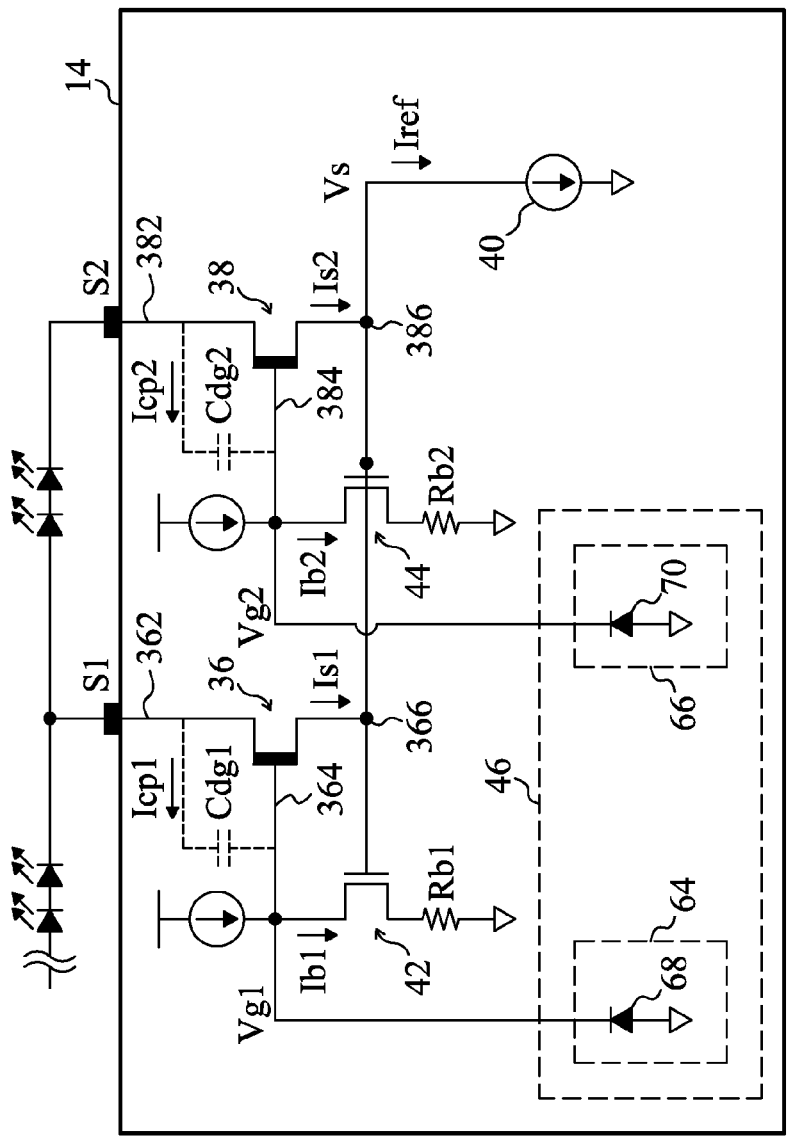
FIG. 8 shows a third embodiment of the present invention.

FIG. 8 shows a third embodiment of the present invention. Similar to the circuitry in FIG. 5, this embodiment also comprises the transistors 36, 38, 42, and 44 and the current source 40. The protection circuit 46 in FIG. 8 includes the clamping circuits 64 and 66 that are coupled to the control terminals 364 and 384 of the transistors 36 and 38, respectively, so as to limit the maximum voltages of the control terminals 364 and 384 of the transistors 36 and 38. In the embodiment of FIG. 8, the clamping circuits 64 and 66 are passive circuits. The clamping circuit 64 includes a Zener diode 68 for limiting the maximum voltage of the control terminal 364 of the transistor 36. An anode of the Zener diode 68 is coupled to the ground terminal, and a cathode of the Zener diode is coupled to the control terminal 384 of the transistor 38. The clamping circuit 66 includes a Zener diode 70 for limiting the maximum voltage of the control terminal 384 of the transistor 38. An anode of the Zener diode 70 is coupled to the ground terminal, and a cathode of the Zener diode 70 is coupled to the control terminal 384 of the transistor 38. When an instant high voltage variation occurs at the pins S1 and S2, currents Icp1 and Icp2 are generated so as to charge a parasitic capacitance Cdg1 between the input terminal 362 and the control terminal 364 of the transistor 36 as well as a parasitic capacitance Cdg2 between the input terminal 382 and the control terminal 384 of the transistor 38, respectively. Accordingly, the voltages Vg1 and Vg2 of the control terminals 364 and 384 of the transistors 36 and 38 increase rapidly. When the voltage Vg1 is higher than the threshold (i.e., the breakdown voltage of the Zener diode 68), the Zener diode 68 is conductive so as to establish a discharge path for discharging the voltage Vg1 of the control terminal 364 of the transistor 36. Thereby, the maximum voltage of the control terminal 364 of the transistor 36 can be limited. Similarly, when the voltage Vg2 is higher than the threshold (i.e., the breakdown voltage of the Zener diode 70), the Zener diode 70 is conductive so as to establish a discharge path for discharging the voltage Vg2 of the control terminal 384 of the transistor 38. Thereby, the maximum voltage of the control terminal 384 of the transistor 38 can be limited.

Figure 9:
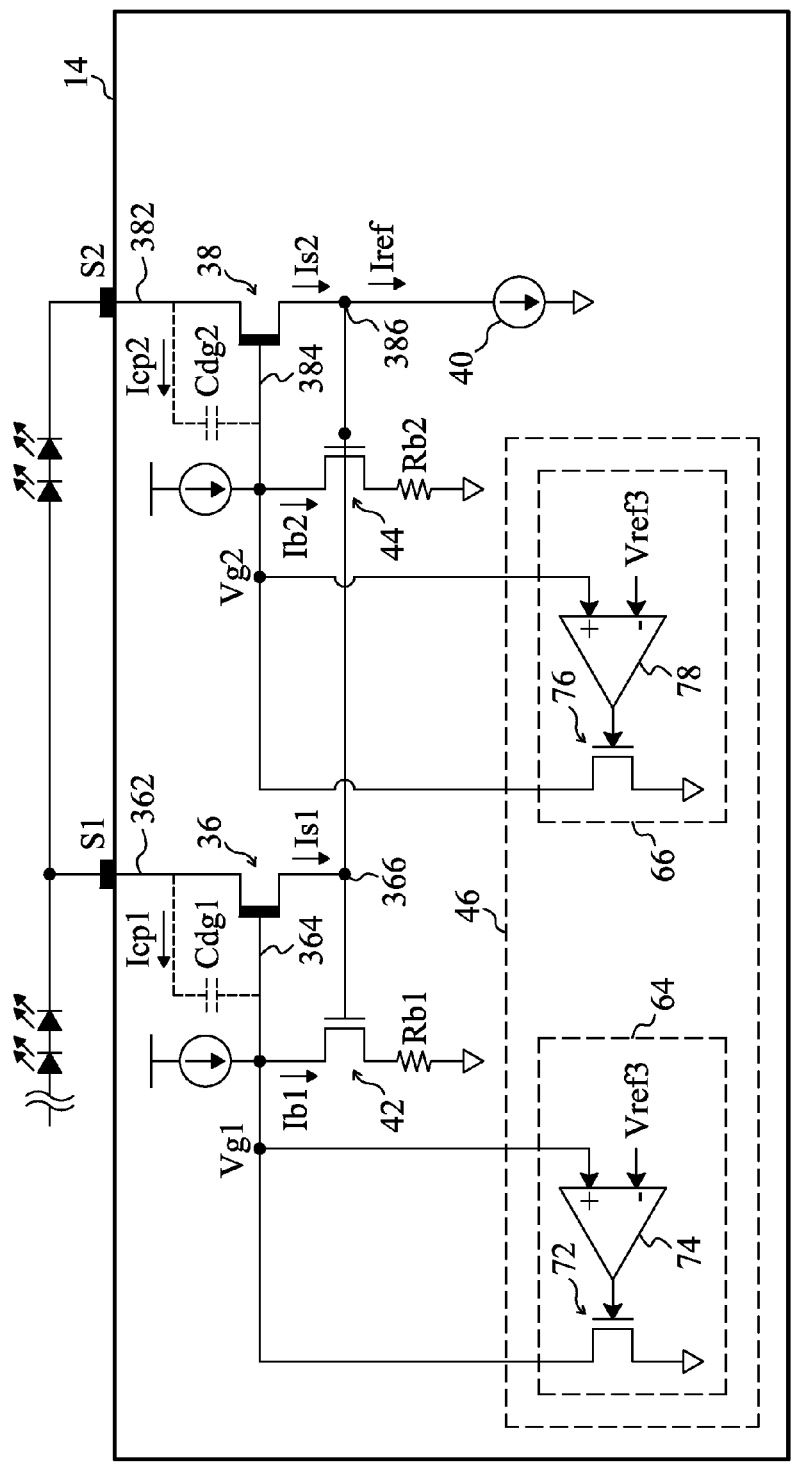
FIG. 9 shows another embodiment for the clamping circuit shown in FIG. 8.

FIG. 9 shows another embodiment for the clamping circuits 64 and 66 in FIG. 8. In this embodiment, the clamping circuits 64 and 66 are active circuits. In FIG. 9, the clamping circuit 64 includes a switch 72 and an operational amplifier 74. The switch 72 is coupled between the control terminal 364 of the transistor 36 and the ground terminal. A positive input terminal of the operational amplifier 74 is coupled to the control terminal 364 of the transistor 36, and a negative input terminal of the operational amplifier 74 receives a threshold Vref3. The output terminal of the operational amplifier 74 is coupled to the control terminal of the switch 72. When the voltage Vg1 of the control terminal 364 of the transistor 36 is higher than the threshold Vref3, the operational amplifier 74 turns on the switch so as to limit the maximum voltage of the control terminal 364 of the transistor 36. The clamping circuit 66 includes a switch 76 and an operational amplifier 78. The switch 76 is coupled between the control terminal 384 of the transistor 38 and the ground terminal. A positive input terminal of the operational amplifier 78 is coupled to the control terminal 384 of the transistor 38, and a negative input terminal of the operational amplifier 78 receives the threshold Vref3. The output terminal of the operational amplifier 78 is coupled to the control terminal of the switch 76. When an instant high voltage variation occurs at the pins S1 and S2, currents Icp1 and Icp2 are generated to charge the parasitic capacitance Cdg1 between the input terminal 362 and the control terminal 364 of the transistor 36 and the parasitic capacitance Cdg2 between the input terminal 382 and the control terminal 384 of the transistor 38, respectively. Thereby, the voltages Vg1 and Vg2 of the control terminals 364 and 384 of the transistors 36 and 38 increase rapidly. When the voltage Vg1 is higher than the threshold Vref3, the operational amplifier 74 will turn on the switch 72 so as to limit the maximum voltage of the control terminal 364 of the transistor 36. Similarly, when the voltage Vg2 is higher than the threshold Vref3, the operational amplifier 78 will turn on the switch 76 to limit the maximum voltage of the control terminal 384 of the transistor 38.

Figure 10:
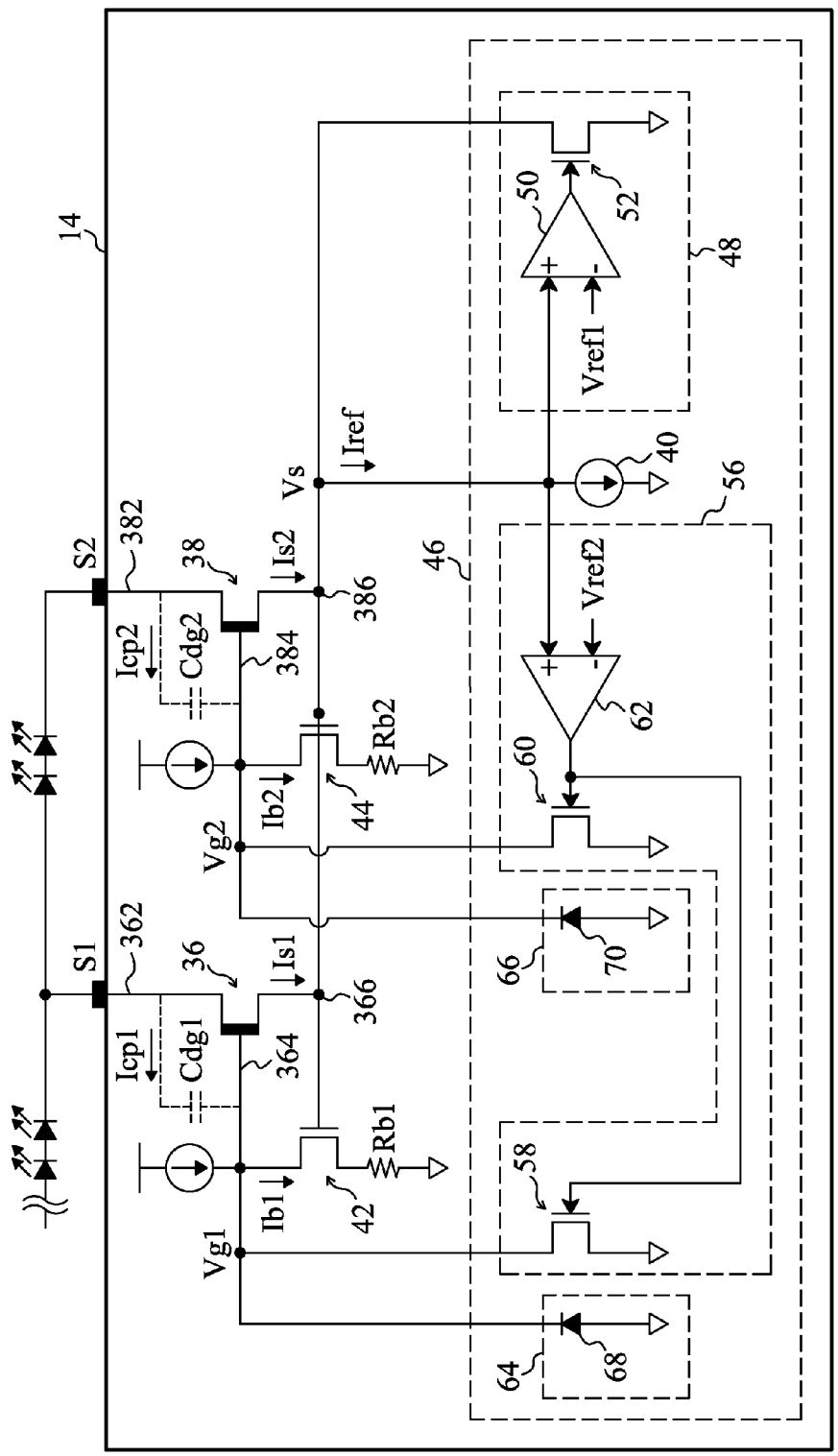
FIG. 10 shows a fourth embodiment of the present invention.

FIG. 10 shows a fourth embodiment of the present invention. This embodiment comprises the transistors 36, 38, 42, and 44 and the current source 40 as the circuitry shown in FIG. 5, while the protection circuit 46 includes the clamping circuits 48, 56, 64, and 66. The circuitry and operation of the clamping circuit 48 shown in FIG. 10 is the same as that of FIG. 5, the circuitry and operation of the clamping circuit 56 shown in FIG. 10 is the same as that of FIG. 7, and the circuitry and operation of the clamping circuits 64 and 66 shown in FIG. 10 is the same as that of FIG. 8. In other embodiments, the clamping circuits 48 and 56 shown in FIG. 10 can also adopt passive circuits, and the clamping circuits 64 and 66 shown in FIG. 10 can also adopt active circuits.

Figure 11:
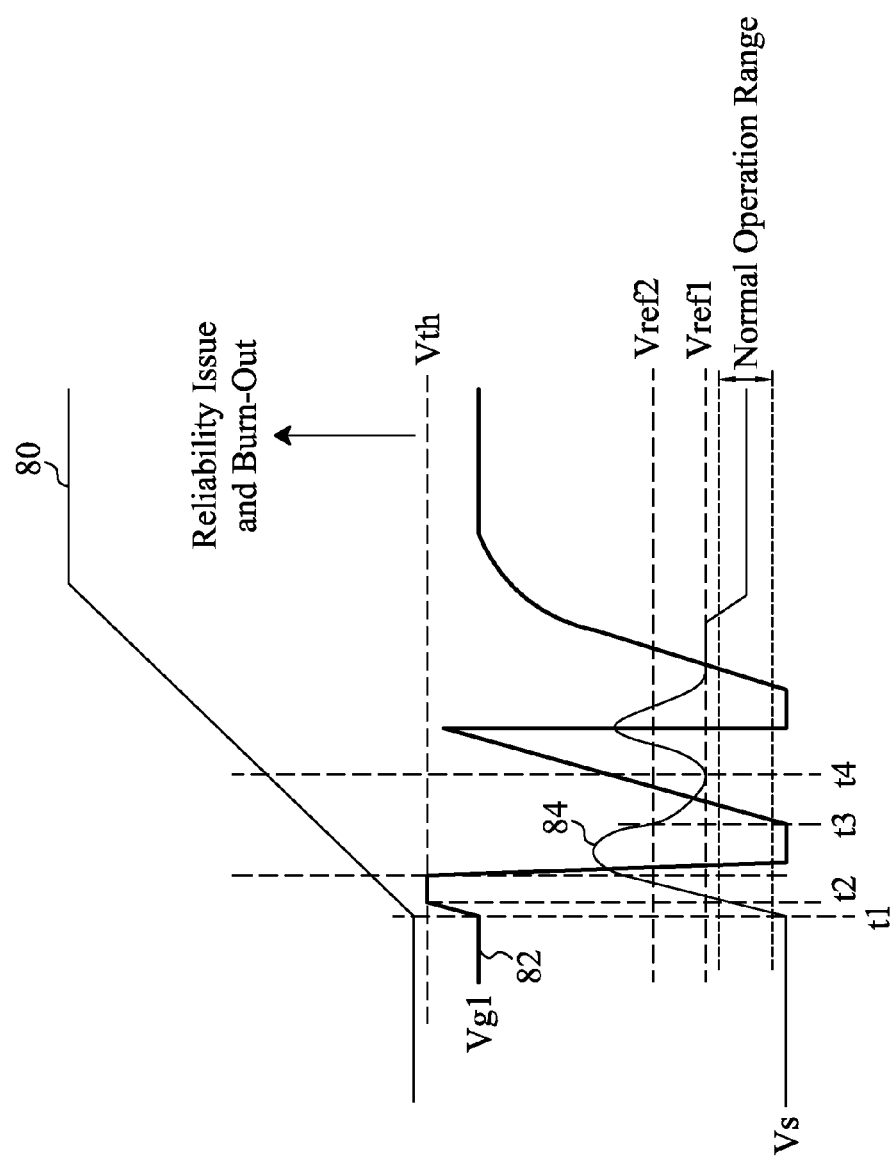
FIG. 11 shows a waveform drawing of the voltages when an instant high voltage variation occurs at the circuit in FIG. 10.

FIG. 11 shows waveforms when an instant high voltage variation occurs at the circuitry shown in FIG. 10, in which the waveform 80 represents the voltage of the pin S1, the waveform 82 represents the voltage Vg1 of the control terminal 364 of the transistor 36, and the waveform 84 represents the voltage Vs of the output terminal 366 of the transistor 36. Referring to FIGS. 10 and 11, when an instant high voltage variation occurring at the pin S1 results in the voltage of the pin S1 rising rapidly, as shown at time t1 in FIG. 11, both the voltages Vg1 and Vs starts rising. At time t2, the voltage Vg1 reaches the breakdown voltage of the Zener diode 68 of the clamping circuit 64. Therefore, the Zener diode 68 becomes conductive and thus limits the maximum of the voltage Vg1, so as to prevent the linear LED driver from being unstable or burn out. At the same time, the voltage Vs keeps increasing. When the voltage Vs is higher than the threshold Vref1, the switch 52 of the clamping circuit 48 is turned on so as to discharge the voltage Vs. Nevertheless, the voltage at the pin S1 still varies severely, the output terminal 366 of the transistor 36 keeps generating the large current Is1. The clamping circuit 48 cannot discharge the current Is1 to the ground terminal completely, so the voltage Vs keeps increasing. When the voltage Vs reaches the threshold Vref2, the switch 58 of the clamping circuit 56 is turned on, and the transistor 36 is turned off. Accordingly, the output terminal 366 of the transistor 36 does not output the current Is1 anymore. While the clamping circuit 48 keeps discharging, the voltage Vs starts decreasing. When the voltage Vs is lower than the threshold Vref2, the switch 58 of the clamping circuit 56 is turned off, and the voltage Vg1 of the control terminal 364 of the transistor starts increasing. At this time, the voltage Vg1 is insufficient for turning on the transistor 36, so the voltage Vs keeps decreasing. When the transistor 36 is turned on again, the voltage Vs will increase again if the voltage at the pin S1 still varies severely, as shown at time t4. The above described operations can be repeatedly executed until the voltage at the pin S1 becomes stable. Thereby, the voltage Vs will stabilize in the normal operation range.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A linear light emitting diode (LED) driver comprising:
   a transistor including an input terminal coupled to a LED which will be lighted when the transistor is turning on;
   a current source coupled to an output terminal of the transistor for regulating a current that passes through the LED; and
   a protecting circuit coupled to the transistor for limiting at least one of a maximum of a voltage of a control terminal of the transistor and a maximum of a voltage of the output terminal of the transistor during the LED is on, thereby preventing the linear LED driver from an abnormal state or an unstable state caused by an instant voltage variation occurring at the input terminal of the transistor.

2. The linear LED driver of claim 1, wherein the protecting circuit comprises a clamping circuit coupled to the output terminal of the transistor for limiting a maximum voltage of the output terminal of the transistor.

3. The linear LED driver of claim 2, wherein the clamping circuit includes:
   a switch coupled between the output terminal of the transistor and a ground terminal; and
   an operational amplifier coupled to the output terminal of the transistor and the switch for turning on the switch to limit the maximum voltage of the output terminal of the transistor when the voltage of the output terminal of the transistor is higher than a threshold.

4. The linear LED driver of claim 2, wherein the clamping circuit comprises a Zener diode for limiting the maximum voltage of the output terminal of the transistor; an anode of the Zener diode is coupled to a ground terminal, and a cathode of the Zener diode is coupled to the output terminal of the transistor.

5. The linear LED driver of claim 1, wherein the protecting circuit comprises a clamping circuit coupled to the control terminal of the transistor and the output terminal of the transistor for detecting the voltage of the output terminal of the transistor and turning off the transistor to limit a maximum voltage of the output terminal of the transistor when the voltage of the output terminal of the transistor is higher than a threshold.

6. The linear LED driver of claim 5, wherein the clamping circuit comprises:
   a switch coupled between the control terminal of the transistor and a ground terminal; and
   an operational amplifier coupled to the output terminal of the transistor and the switch for turning on the switch so as to turn off the transistor when the voltage of the output terminal of the transistor is higher than the threshold.

7. The linear LED driver of claim 1, wherein the protecting circuit comprises a clamping circuit coupled to the control terminal of the transistor for limiting a maximum voltage of the control terminal of the transistor.

8. The linear LED driver of claim 7, wherein the clamping circuit comprises a Zener diode for limiting the maximum voltage of the control terminal of the transistor; an anode of the Zener diode is coupled to a ground terminal, and a cathode of the Zener diode is coupled to the control terminal of the transistor.

9. The linear LED driver of claim 7, wherein the clamping circuit comprises:
   a switch coupled between the control terminal of the transistor and a ground terminal; and
   an operational amplifier coupled to the control terminal of the transistor and the switch for turning on the switch to limit the maximum voltage of the control terminal of the transistor when the voltage of the control terminal of the transistor is higher than a threshold.

10. The linear LED driver of claim 1, wherein the protecting circuit comprises:
    a first clamping circuit coupled to the output terminal of the transistor for limiting a maximum voltage of the output terminal of the transistor;
    a second clamping circuit coupled to the control terminal of the transistor and the output terminal of the transistor for detecting the voltage of the output terminal of the transistor and turning off the transistor to limit the maximum voltage of the output terminal of the transistor when the voltage of the output terminal of the transistor is higher than a threshold; and
    a third clamping circuit coupled to the control terminal of the transistor for limiting a maximum voltage of the control terminal of the transistor.

11. The linear LED driver of claim 10, wherein the first clamping circuit comprises:
    a switch coupled between the output terminal of the transistor and a ground terminal; and
    an operational amplifier coupled to the output terminal of the transistor and the switch for turning on the switch to limit the maximum voltage of the output terminal of the transistor when the voltage of the output terminal of the transistor is higher than a second threshold.

12. The linear LED driver of claim 10, wherein the first clamping circuit comprises a Zener diode for limiting the maximum voltage of the output terminal of the transistor; an anode of the Zener diode is coupled to a ground terminal, and a cathode of the Zener diode is coupled to the output terminal of the transistor.

13. The linear LED driver of claim 10, wherein the second clamping circuit comprises:
   a switch coupled between the control terminal of the transistor and a ground terminal; and
   an operational amplifier coupled to the output terminal of the transistor and the switch for turning on the switch to turn off the transistor when the voltage of the output terminal of the transistor is higher than the threshold.

14. The linear LED driver of claim 10, wherein the third clamping circuit comprises a Zener diode for limiting the maximum voltage of the control terminal of the transistor; an anode of the Zener diode is coupled to a ground terminal, and a cathode of the Zener diode is coupled to the control terminal of the transistor.

15. The linear LED driver of claim 10, wherein the third clamping circuit comprises:
   a switch coupled between the control terminal of the transistor and a ground terminal; and
   an operational amplifier coupled to the control terminal of the transistor and the switch for turning on the switch to limit the maximum voltage of the control terminal of the transistor when the voltage of the control terminal of the transistor is higher than a second threshold.

16. The linear LED driver of claim 1, wherein the transistor is a high-voltage component.

17. The linear LED driver of claim 1, wherein the transistor is a metal-oxide-semiconductor field effect transistor.

18. The linear LED driver of claim 1, wherein the transistor is an insulated gate bipolar transistor.

19. A control method of a linear LED driver including a transistor having an input terminal coupled to a LED, a control terminal, and an output terminal, comprises the steps of:
   A. turning on the transistor in order to light the LED; and
   B. limiting at least one of a maximum of a voltage of the control terminal of the transistor and a maximum of a voltage of the output terminal of the transistor during the LED is on, thereby preventing the linear LED driver from an abnormal state or an unstable state caused by an instant voltage variation occurring at the input terminal of the transistor.

20. The control method of claim 19, wherein the step B comprises limiting a maximum voltage of the output terminal of the transistor.

21. The control method of claim 20, wherein the step of limiting the maximum voltage of the output terminal of the transistor comprises forming a discharge path when the voltage of the output terminal of the transistor is higher than a threshold for discharging the voltage of the output terminal of the transistor, thereby limiting the maximum voltage of the output terminal of the transistor.

22. The control method of claim 20, wherein the step of limiting the maximum voltage of the output terminal of transistor comprises turning off the transistor when the voltage of the output terminal of the transistor is higher than a threshold, thereby limiting the maximum voltage of the output terminal of the transistor.

23. The control method of claim 19, wherein the step B comprises limiting the maximum voltage of the control terminal of the transistor.

24. The control method of claim 23, wherein the step of limiting the maximum voltage of the control terminal of the transistor comprises forming a discharge path when the voltage of the control terminal of the transistor is higher than a threshold for discharging the voltage of the control terminal of the transistor, thereby limiting the maximum voltage of the control terminal of the transistor.

25. The control method of claim 19, wherein the step B comprises the steps of:
   limiting the maximum voltage of the output terminal of the transistor; and
   limiting the maximum voltage of the control terminal of the transistor.

26. The control method of claim 25, wherein the step of limiting the maximum voltage of the output terminal of the transistor comprises forming a discharge path when the voltage of the output terminal of the transistor is higher than a threshold for discharging the voltage of the output terminal of the transistor, thereby limiting the maximum voltage of the output terminal of the transistor.

27. The control method of claim 25, wherein the step of limiting the maximum voltage of the output terminal of the transistor comprises turning off the transistor when the voltage of the output terminal of the transistor is higher than a threshold, thereby limiting the maximum voltage of the output terminal of the transistor.

28. The control method of claim 25, wherein the step of limiting the maximum voltage of the control terminal of the transistor comprises forming a discharge path when the voltage of the control terminal of the transistor is higher than a threshold for discharging the voltage of the control terminal of the transistor, thereby limiting the maximum voltage of the control terminal of the transistor.

\* \* \* \* \*